United States Patent [19]

Koshiba et al.

[11] Patent Number: 4,844,994
[45] Date of Patent: Jul. 4, 1989

[54] CHARGEABLE ELECTROCHEMICAL DEVICE

[75] Inventors: Nobuharu Koshiba, Ikoma; Keigo Momose, Hirakata; Hayashi Kayakawa, Shijonawate, all of Japan

[73] Assignee: Matsushita Electric Industrial Co., Ltd., Osaka, Japan

[21] Appl. No.: 236,315

[22] Filed: Aug. 25, 1988

Related U.S. Application Data

[63] Continuation of Ser. No. 923,169, Oct. 23, 1986, abandoned.

[30] Foreign Application Priority Data

Apr. 17, 1984 [JP] Japan .................. 59-76922

[51] Int. Cl.$^4$ .................. H01M 4/40; H01M 6/16
[52] U.S. Cl. .................. 429/60; 429/197; 429/218; 429/222; 429/226
[58] Field of Search .................. 429/60, 194, 197, 218, 429/226, 222, 225

[56] References Cited

U.S. PATENT DOCUMENTS

| | | | |
|---|---|---|---|
| 3,700,975 | 10/1972 | Butherus et al. | 252/62.6 |
| 3,907,593 | 9/1975 | Marincic | 429/218 X |
| 4,011,372 | 3/1977 | Tomczyk et al. | 429/218 |
| 4,335,191 | 6/1982 | Peled | 429/196 X |
| 4,434,213 | 2/1984 | Niles et al. | 429/194 X |
| 4,461,816 | 7/1984 | Leribaux | 429/218 X |
| 4,632,889 | 12/1986 | Mc Manis et al. | 429/218 |

FOREIGN PATENT DOCUMENTS

| | | | |
|---|---|---|---|
| 52-70333 | 6/1977 | Japan . | |
| 0017871 | 1/1985 | Japan | 429/218 |
| 0167280 | 8/1985 | Japan | 429/218 |
| 8404001 | 10/1984 | World Int. Prop. O. | 429/218 |

OTHER PUBLICATIONS

"Nikkei Electronics", No. 339, Mar. 26, (1984), pp. 93 and 94, and English translation thereof.

Primary Examiner—Anthony Skapars
Attorney, Agent, or Firm—Stevens, Davis, Miller & Mosher

[57] ABSTRACT

A rechargeable electrochemical device comprising a cathode (6) composed chiefly of activated carbon, anode (3) composed of a lithium alloy, and an electrolyte composed of an organic solvent in which a lithium salt is dissolved. Lithium content in the lithium alloy forming the anode (3) is selected such that, if converted to the electric capacity under the charged condition, the capacity of this alloy ranges from 3 to 20 times the cathode capacity that is obtained when the cathode is discharged from 3.0V to 2.0V in a single-pole potential with respect to metal lithium. This constitution is able to provide a reliable rechargeable electrochemical device, which is proof against super-discharge and excellent in charge and discharge cycle life.

6 Claims, 7 Drawing Sheets

CHARGEABLE ELECTROCHEMICAL DEVICE

This application is a continuation of Ser. No. 923,169, filed Oct. 23, 1986, now abandoned.

FIELD OF ART

This invention relates to a rechargeable electrochemical device which is usable as a portable DC power source, backup power source and the like.

More particularly, the invention relates to the improvements on electrochemical devices consisting of a non-aqueous electrolyte containing lithium ions, a cathode (positive electrode) composed of active carbon, and an anode (negative electrode) made of a lithium alloy which is capable of reversibly occluding and releasing lithium with charging and discharging.

BACKGROUND ART

The charge and discharge principle of rechargeable electrochemical devices is based on a complex reaction system making use of the migration of lithium ions between the cathode and anode and a redox reaction of lithium at each electrode as well as charge and discharge of an electric double layer formed by active carbon of the cathode. According to this system, the output voltage is as high as 3 V and also the charge/discharge cycle life is long. As a contrivance resembling this type of device, there is known a structure in which carbon is used for the cathode, lithium for the anode and a non-aqueous solution as the electrolyte as disclosed in U.S. Pat. No. 3,700,975 specification. This makes use of an electrochemical reaction of lithium at the anode and a space charge layer (electric double layer) at the cathode. The space charge layer formed at the cathode originates from anions which are a solute of the electrolyte.

From close examination of the characteristics of this device, it was found that in case, for example, anode of lithium and cathode of active carbon are simply combined by using said both materials in a same volume, the charge/discharge cycle life is very long when the drop of terminal voltage from its maximum 3.0 V does not exceed 2.0 V, but when the device is discharged till the terminal voltage drops close to 0 V, no full recovery of voltage can be attained even when the device is charged and its electric capacity is markedly reduced.

Analyzing this phenomenon, it can be inferred that such phenomenon is attributable to the facts that when the terminal voltage is in the region below about 2 V, lithium of the anode migrates excessively to the cathode, far in excess of the capacity of the electric double layer of the cathode, and lithium is discouraged from returning to the cathode even when charging is done, and that due to the accumulation of lithium on active carbon, a substantial portion of the electric double layer on the surface of active carbon is lost.

On the other hand, comparing the electric capacities of the cathode and the anode, it is seen that in case the cathode is made of lithium alone, its energy density is as high as 3,840 mAh/g, or about 204 mAh/cc. In the case of the cathode using active carbon, the quantity of electricity which it can store is far less than that storable with lithium. For instance, in case discharge is made from 3.0 V to 2.0 V in single electrode potential versus lithium, the electric capacity of the cathode using active carbon becomes 1/100 or less as compared with that of the cathode using the same volume of lithium, although the value varies depending on the kind of active carbon used.

Therefore, in case the cathode and the anode are simply combined by using the same volume of materials as in the above example, the electric capacity of the anode may become more than 100 times that of the cathode, resulting in an extreme unbalance of electrode potential, so that when the device is overcharged, it becomes difficult to restore the original capacity even if the device is later charged for the above-said reason.

As for the causes of deterioration of the device when it is overcharged, beside said unbalance of both electrodes, the fact is noted that great influence is also given by the type of alloy used for the cathode. For instance, in case the cathode is made of lithium alone there is produced dendrite of lithium by repetition of charging and discharging, and this dendrite causes shortcircuiting of both electrodes and deprives the lithium of its activity.

As means for preventing this, use of an alloy capable of both occluding and releasing lithium can suppress generation of dendrite. Thus, it is expected that the device can be made more solid against overcharging by use of such alloy. However, the rate and amount of lithium occluded and released as well as the plate strength vary according to the type of alloy used. For example, when a 50/50 (by weight) Pb/Cd alloy is used, although the plate strength increases, the lithium occlusion and release rate becomes low. Therefore, when charging and discharging are repeated at a large current value, lithium becomes unable to be uniformly dispersed in the alloy, and as a result, dendrite tends to be produced to invite a reduction of performance of the device.

The present invention has for its object to realize an improvement on balance of cathode and anode and the type of alloy used for the anode as well as the optimization of cell structure and to provide a rechargeable electrochemical device which will not deteriorate in its electrochemical properties even when discharged to 0 V and has a long charge/discharge service life and high reliability.

DISCLOSURE OF THE INVENTION

In order to accomplish said object, as a result of various studies on the blending ratio of lithium in anode alloy and cathode, the present invention is characterized in that the content of lithium in anode alloy in terms of electric capacity is adjusted such that it will be 3 to 20 times, preferably 10 to 20 times that of the cathode which is obtained when the cathode is discharged till the single electrode potential versus metallic lithium is reduced from 3.0 V to 2.0 V.

Figure 1:
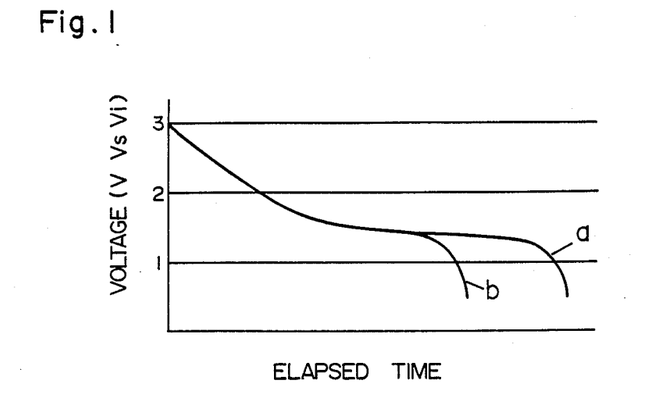
FIG. 1 is a diagram showing the discharge characteristics of a conventional rechargeable electrochemical device.

When the cathode made of active carbon is discharged at a constant current with metallic lithium as a reference electrode, discharge goes on with a voltage drop characteristics pattern close to a straight line until the voltage drops from 3 V to a level near 2 V, but in the lower voltage region, a rather flat curve is formed and finally the voltage drops to 0 V as shown in FIG. 1. The first straight-line portion is considered to be mainly governed by the electric double layer of the cathode, and is the discharge characteristics of the cathode rate-termination. In this case, however, the ions forming the electric double layer are not always anions, and it can be supposed that the cations (lithium ions) would rather be predominant. The reasons is that since this device can generate voltage and discharge electricity even if it is not charged after assemblage, it is more appropriate to consider that, during discharge, lithium in the anode is ionized and such lithium ions transfer to the cathode and are adsorbed by active carbon to form an electric double layer.

Further, in the voltage region below 2 V, the flatness of the curve differs depending on the content of lithium. The higher the lithium content, the longer becomes the flat section of the curve.

BRIEF DESCRIPTION OF THE DRAWINGS

FIG. 7 (A) and (B) are the graphs showing the overdischarge recovery characteristics in relation to the blended ratio of the alloy.

BEST MODE FOR CARRYING OUT THE INVENTION

By investigating the discharge characteristics, it was found that in the voltage region below 2 V, the longer the flat section of the voltage drop curve, the smaller is the discharge capacity after charging as shown by b in FIG. 1, and the shorter the flat section of said curve, the better is the voltage recovery after charging as shown by b.

This points to the fact that excess lithium is associated with discharge in the voltage region below 2 V, and also that excess lithium which transferred to the anode acts to reduce the electric double layer on the surface of active carbon.

From these facts, it was found that by reducing the flat section of the curve below 2 V as much as possible by limiting the content of lithium, it is possible to keep the charge and discharge characteristics from being deteriorated even after discharge has been made to a point close to 0 V.

Also, as seen in U.S. Pat. No. 3,700,975 specification, in case the anode is made of lithium alone, the ionized lithium is not always uniformly precipitated on lithium as said above but dendrite is also precipitated, giving rise to the problem that the separator might be broken by such dendrite to to cause internal shortcircuiting to reduce the charge and discharge cycle life.

Further, it is often beset with difficulties to produce the lithium pellets with a small capacity which is several to several tens of times the electric capacity of the cathode.

These problems can be solved all at once by using a lithium-occlusive metal or alloy for the anode and by having a necessary amount of lithium added previously in such metal.

As for the method for adding lithium in metal, lithium can be occluded in metal by melting and alloying them in an inert atmosphere or by electro-depositing lithium on metal in an organic electrolyte.

Figure 3:
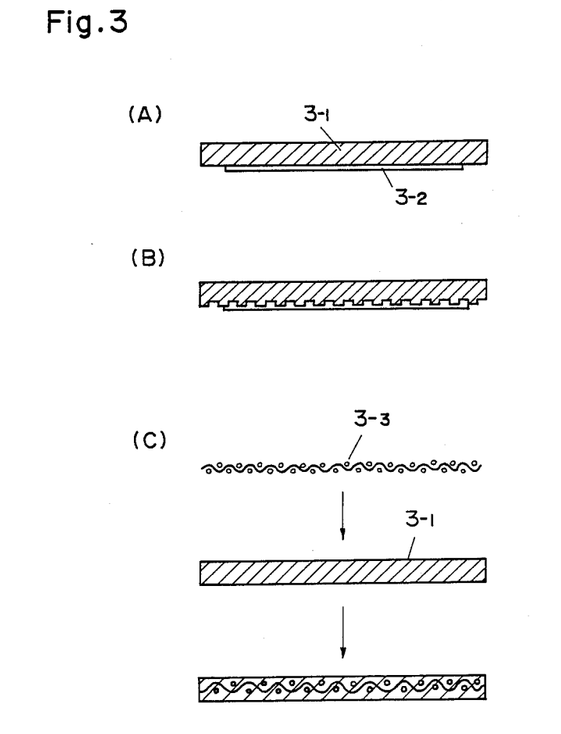
FIG. 3 shows the sectional view of a anode alloy used in said device of this invention, wherein (A) shows a state where lithium was pressedly adhered to the alloy, (B) shows a state where indentations were formed on the alloy and lithium was pressedly adhered to the indented portion of the alloy, and (C) shows a state where a current collector was adhered to the alloy.

Further, the lithium alloy used here is usually very small in thickness, which is less than $300\mu$, and is therefore weak in strength, and the strength is reduced little by little by repeated occlusion and release of lithium in particular. Also, it is desirable to apply welding for connection to the anode case, but it is here impossible to directly apply spot welding. So, if a current collector metal 3-3 having good conductivity and capable of spot welding is attached to one side of the alloy 3-1 as shown in FIG. 3(C), the anode alloy can be increased in strength, is improved in conductivity, can be easily welded to the anode case and becomes able to stand a long period of charging and discharging cycles. A net or lath of stainless steel, titanium, nickel or the like can be preferably used as current collector.

As the electrolyte, there can be used those electrolytes which are ordinarily employed for primary cells, in which propylene carbonate (PC), $\gamma$-butyrolactone ($\gamma$-BL), 1,2-dimethoxyethane (DME), tetrahydrofuran (THF), 1,3-dioxolan (DOX) and the like are used singly or in amixture as solvent and $LiClO_4$, $LiBF_4$ and the like are used as solute. Among these electrolytes, those made by adding $LiBF_4$ or $LiClO_4$, $LiAsF_6$, $LiAlCl_4$ or the like as solute to a single solvent of $\gamma$-BL or a mixed solution of PC and DME showed an excellent effect in recovering the charge and discharge characteristics even after the device has been discharged close to 0 V and thereafter left in that state for a long time.

Hereinafter, the invention will be further described by way of the examples thereof.

EXAMPLE 1

There was prepared 80 parts by weight of pulverized active carbon, and this was mixed and kneaded with an aqueous dispersion of fluorine resin (about 60% in solids concentration) in an amount of 20 parts by weight in solid matter. The mixture was shaped into a sheet between two rolls and transferred to a 0.2 mm thick titanium lath. This was dried in vacuo at 150° C. for 12 hours, adjusted to a thickness of 0.7 mm and stamped into plates of 14.5 mm in diameter. The weight of each plate was about 110 mg. These plates were subjected to a discharge test in an electrolyte prepared by adding $LiBF_4$ in a ratio of 1 mol/l to a 2:1 mixed solution of PC and DME by using metallic lithium as reference electrode. There were picked up those plates which had a discharge capacity of just 1 mAh in the period when the single electrode potential dropped from 3.0 V to 2.0 V, and they were again charged to restore the original state and used as cathode 6.

Next, a $100\mu$ thick Pb sheet was formed by rolling, and to one side thereof was pressedly attached a 60-mesh SUS 304 stainless steel net having a line diameter of 0.1 mm and the assembly was stamped into plates of 14.5 mm in diameter. By using these plates, there were obtained the anodes by an electrodeposition methods (in the case of 1, 3, 7 and 10 mAh) in which electrolysis was conducted in an organic electrolyte and a lithium foil adhesion method (in the case of 20, 30, 50 and 70 mAh), both methods being conducted such that the content of lithium would take the values corresponding to 1, 3, 7, 10, 20, 30, 50 and 70 mAh in electric capacity of anode in the charged state.

A laminate of a microporous film of polypropylene and a non-woven fabric of polypropylene was prepared as separator, and a solution made by adding 1 mol/l of LiBF4 to a 1:1:1 mixed solution of PC, DME and γ-BL was prepared as electrolyte.

Figure 2:
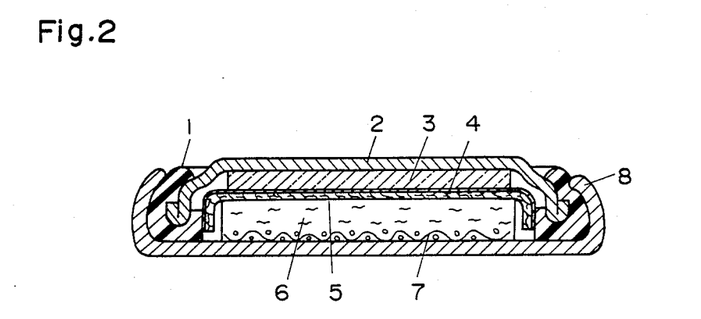
FIG. 2 is a sectional view of a rechargeable electrochemical device in accordance with this invention.

By using these materials, an electrochemical device such as shown in FIG. 2 was made. It had the dimensions of 20 mm in diameter and 1.6 mm in thickness.

First, an insulating seal ring 1 made of polypropylene was combined with a saucer-like stainless steel-made sealing plate 2 which doubled as an anode terminal, and the assembly was set stationarily with its open side facing upward.

Then the previously prepared lithium alloy anode 3 was placed in said sealing plate 2 and a current collector was spot welded to the inside of said plate.

Next, a saucer-like assembly of a separator 4 and an impregnating material 5 was properly set in position and then said electrolyte was injected thereinto. Thereafter, the cathode plates 6 were placed such that the titanium current collector 7 thereof would contact the cathode case 8, and then said titanium current collector 7 and cathode case 8 were spot welded, followed by injection of said electrolyte. Then the above-said sealing plate assembly was fitted in said cathode case, and the case opening was closed by caulking it inwardly.

The thus obtained electrochemical devices are designated A1–A8.

EXAMPLE 2

100 μm thick alloy sheets of the compositions and blended amounts of materials (ratio by weight) shown in the following table were prepared as anode. A 60-mesh stainless steel net having a line diameter of 0.1 m was pressedly attached to these sheets, and each assembly was stamped into plates of 14.5 mm in diameter. These plates were electrically welded to a sealing plate of the same type as used in Example 1, and by using them, the anodes were prepared by lithium electrodeposition for the ones having an electric capacity of 3 mAh and by lithium foil adhesion method for the ones having an electrical capacity of 10 and 30 mAh. The lithium applied here was in a dischargeable charged state.

TABLE 1

| Alloy | | | Lithium content mAh | | |
|-------|---|---|---|---|---|
|  |  |  | 3 | 10 | 30 |
| Bi | Cd | 50:50 | B1 | B13 | B25 |
| " | " | 70:30 | B2 | B14 | B26 |
| Bi | Pb | 50:50 | B3 | B15 | B27 |
| " | " | 70:30 | B4 | B16 | B28 |
| Bi | Sn | 50:50 | B5 | B17 | B29 |
| " | " | 70:30 | B6 | B18 | B30 |
| Pb | Cd | 50:50 | B7 | B19 | B31 |
| " | " | 70:30 | B8 | B20 | B32 |
| Pb | Sn | 50:50 | B9 | B21 | B33 |
| " | " | 70:30 | B10 | B22 | B34 |
| Sn | Cd | 50:50 | B11 | B23 | B35 |
| " | " | 70:30 | B12 | B24 | B36 |

By using electrodes and the otherwise completely same arrangements as Example 1, there were made the electrochemical devices, which were given Nos. of B1–B36 shown in the table.

By using these devices A1–A8 and B1–B36, each device was charged at a constant voltage of 3 V and, after measuring the time in which each device was discharged till the voltage dropped from 3 V to 2 V at a constant current of 100 μA, charge and discharge were repeated ten times between 3.0 V and 2.0 V at a constant current of 1 mA. Then again the discharge time required for each device till the voltage dropped from 3 V to 2 V at a constant discharge current of 100 μA was measured, and the retention rate of electric capacity to the initial value was calculated. In the initial discharge, all of the devices excepting A1 had a discharge capacity of 1.0 mAh after about 1.0 hour of discharge. In the case of A1, the discharge time was less than 0.5 hour and insufficient electric capacity could be obtained.

Figure 4:
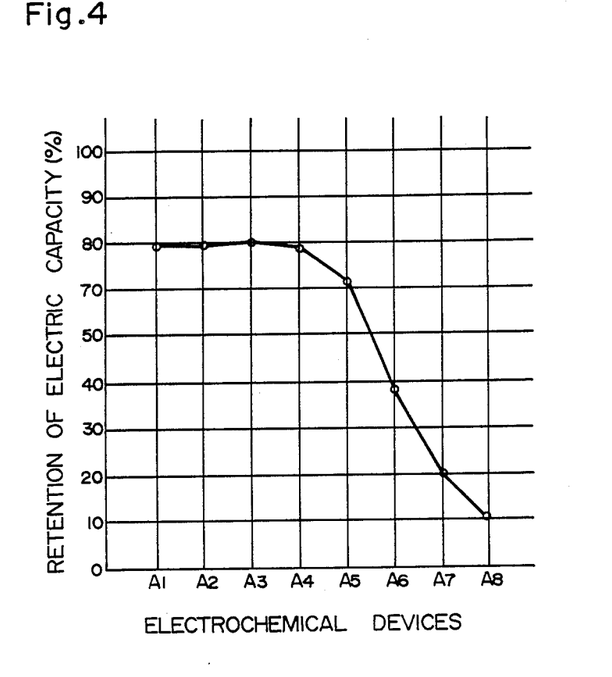
FIGS. 4 and 5 are the graphs showing the overdischarge recovery characteristics in relation to the amount of lithium in the anode.
Figure 5:
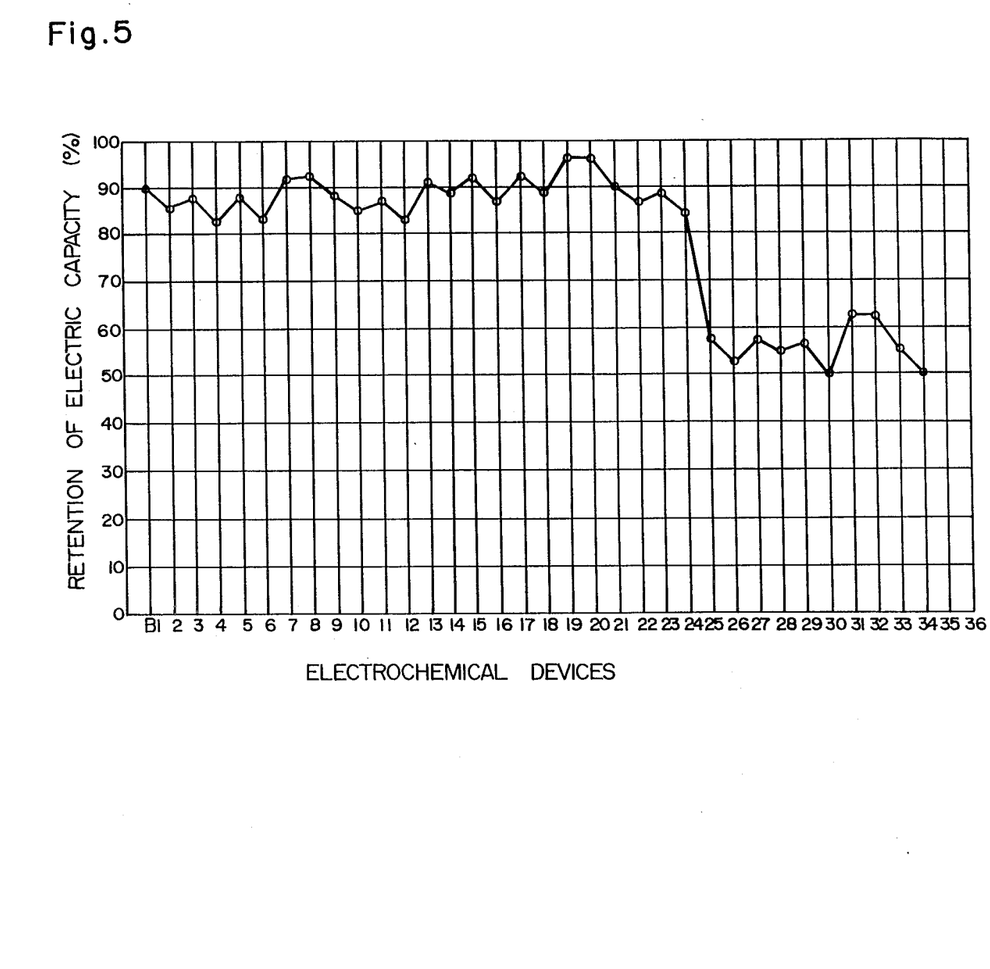

The degree of deterioration due to discharge was shown in terms of retention of electric capacity in FIGS. 4 and 5.

In FIG. 4, it is seen that the deterioration is remarkable when the lithium content, as measured, when converted to electric capacity, becomes higher than 30 mAh.

From these facts, it is noted that in order to maintain the retention of electric capacity at a high level, the lithium content should not be greater than 20 times the discharge capacity (governed by the cathode) when the cathode was discharged till the single electrode potential vs metallic lithium dropped from 3 V to 2 V. It is also noted that the lithium which entered the alloy does not entirely migrate to the cathode when discharged but remains in the alloy by an amount approximately twice the cathode capacity. In view of this, the optimal lithium content is from 3 to 20 times the discharge capacity of the cathode.

In FIG. 5, it is seen that the retention of capacity is not much affected by the type of the alloy used but greatly differs depending on the lithium content. It is noted that the retention of capacity is highest when lithium is added in an amount equivalent to 10 mAh and greatly reduced at a lithium content equivalent to 30 mAh.

EXAMPLE 3

For forming anodes, a 50:50 (by weight) Pb:Cd composition was used and lithium was further added thereto so that the lithium content (% by weight) would become 0.3, 0.5, 1, 3, 5, 7 and 10%, the materials being then melted and alloyed. Each lithium alloy was worked into a sheet about 80μ thick and the sheet was stamped into plates each having a weight of about 100 mg. Then a 60-mesh stainless steel net having a line diameter of 0.1 mm was attached thereto and the net was electrically welded to a sealing plate 2. By using these electrodes and otherwise the completely same arrangements as Example 1, there were produced the electrochemical devices, which are designated C1–C7.

Figure 6:
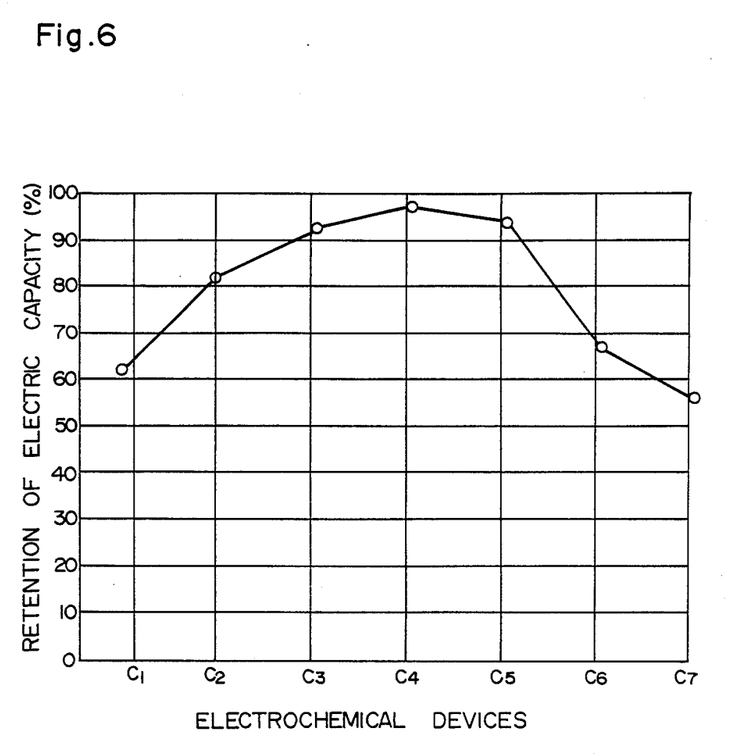
FIG. 6 is a graph showing the overdischarge recovery characteristics based on the lithium content (% by weight) in the anode alloy.

Each of these devices C1–C7 was subjected to the same evaluation as in Examples 1 and 2 and the retention rates of electric capacity of these devices were compared. The results are shown in FIG. 6. As apparent from FIG. 6, the retention of electric capacity is high when the lithium content in the anode alloy is in the range of 0.5 to 5% as in C2–C5, but the retention is greatly lowered in case the lithium content is 0.3% and over 7%. In view of this, the lithium content in the alloy is preferably 0.5 to 5%.

In all of Examples 1 to 3, in case the lithium content was equivalent to 30 mAh or higher, as regards the initial discharge characteristics, a long flat section of voltage drop curve appeared in the region below 2.0 V as shown in FIG. 1. Contrarily, in case the lithium content was equivalent to 20 mAh or less, the flat section in said region was very short or almost none.

Further, a chemical analysis of the cathode showed that in the case of the long flat section of voltage curve in the region below 2.0 V, a considerable amount of lithium is precipitated in some form or other. From this, it became clear that by controlling the fill of lithium, the migration of lithium to the cathode during discharge can be confined to the minimum and the retention of electric charge is not lowered even when the device is discharged to a point close to 0 V.

EXAMPLE 4

As anodes, there were prepared 100μ thick alloy sheets of Pb/Bi/Cd compositions in which the Cd content was fixed at 30% by weight while the Bi content was made 0, 1, 3, 5, 10, 20, 30, 40 and 50% by weight, with Pb taking the balance, and each sheet was attached with a 60-mesh stainless steel SUS 304 net of 0.1 mm in line diameter and stamped into plates of 14.5 mm in diameter. Then lithium was incorporated therein by the lithium foil adhesion method so that the lithium content would become equivalent to 10 mAh in electric capacity, and the electrochemical devices were made in otherwise the same way as Example 1. These devices are designated D1–D9.

EXAMPLE 5

Anodes were prepared by using Pb/Bi/Cd compositions in which the Bi content was fixed at 20% by weight while the Cd content was made 10, 20, 30, 40, 50, 60 and 70% by weight, with Pb taking the balance, and the electrochemical devices were made in otherwise the same way as Example 4, these devices being designated E1–E7.

Each of these devices D1–D9 and E1–E7 was first charged at 3 V for 2 hours and then discharged at a constant resistance load of 3 KΩ, and after measuring the discharge time till reaching 2 V in voltage drop, each device was kept under high temperature (60° C.) and high humidity (90% RH) for 2 months. Thereafter, charging and discharging were repeated 10 times under the charging conditions of 3 V and 6 hours and the discharging conditions of 3 KΩ and 10 hours, and the discharge capacity in the period till the terminal voltage at the 10th cycle reached 2 V was compared with the initial capacity. The results are shown in FIG. 7 (A) and (B).

Figure 7:
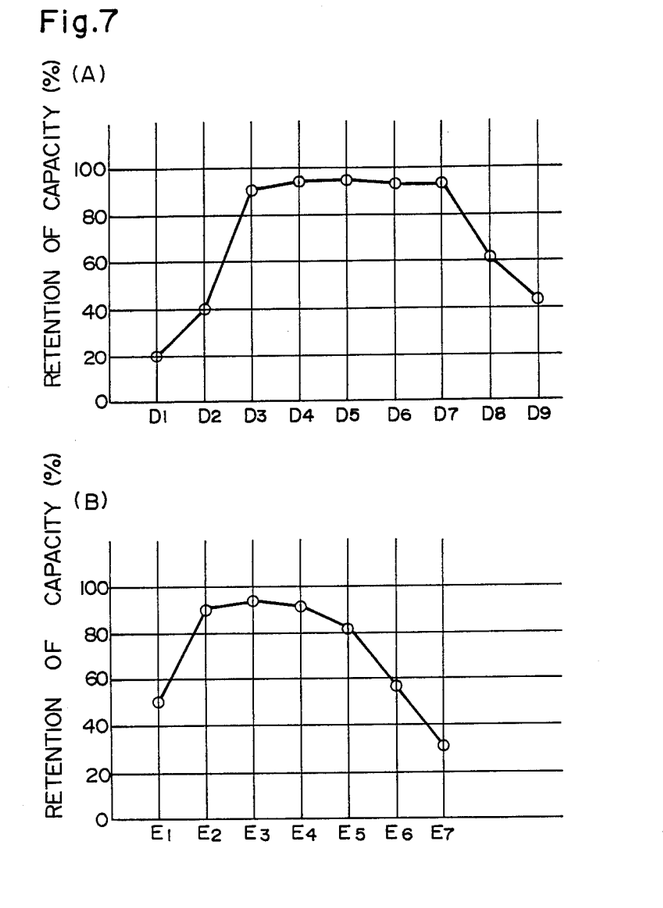

As apparent from FIG. 7, it was found that in case Pb, Cd and Bi are used as anode alloy, the produced device can well stand use even under high-temperature and high-humidity environments.

The appliable amount ranges of said alloy elements are 3 to 30% by weight for Bi, 20 to 50% by weight for Cd, and the balance for Pb.

Considering why such amount ranges are suited, the fact is noted that Bi has a extremely high lithium occlusive capacity but on the other hand it is very frail and has a nature that it tends to be deformed by repeated occlusion and release of lithium. Cd has no high lithium occlusive capacity but is excellent as a component material and can be easily alloyed with other components, zis. Pb and Bi. Further, Pb has no remarkably high lithium occlusive capacity and cannot adapt itself to high-rate charging and discharging, but it is excellent in ductility and has a nature that it can be easily worked even when alloyed with Bi and Cd. It is considered that by blending said three components in proper ratios, it becomes possible to secure the nature (of the device) of being able to well stand the use even under harsh environments such a mentioned above.

EXAMPLE 6

The electrochemical devices of F1–F4 were assembled in the same way as Example 1 except that the lithium content was fixed to a value equivalent to 10 mAh and that the electrolytes of the compositions shown in Table 2 were used.

TABLE 2

| | Type | Blending ratio | Solute |
|---|---|---|---|
| F1 | PC:DME | 1:1 | LiBF$_4$ |
| F2 | γBL:DME | 1:1 | 1 mol/l |
| F3 | PC:γBL | 1:1 | |
| F4 | PC:γBL:DME | 1:1:1 | |

Each of these devices was first charged at 3 V for 2 hours and then discharged at a resistance load of 3 KΩ, and after measuring the discharge time till reaching 2 V, each device, while connected to the load of 3 KΩ, was left under an environment of 60° C. and 90% RH for one month. Thereafter, each device was further charged at 3 V for 6 hours and again discharged at a resistance of 3 KΩ, and the electric capacity at this point was compared with the initial capacity to determine the retention of capacity. The results are shown in FIG. 8.

Figure 8:
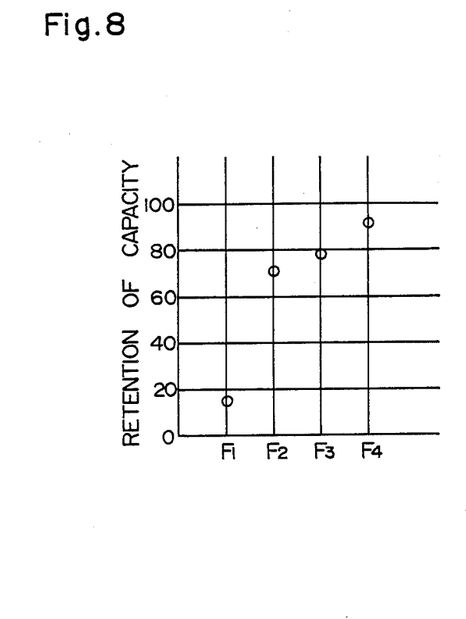
FIG. 8 is a diagram showing the overdischarge recovery characteristics according to the type of electrolyte.

As apparent from FIG. 8, when an electrolyte containing γ-BL is used, good capacity recovery properties are provided, but in the case of the electrolyte with PC:DME=1:1 and containing no γ-BL, almost no recovery of capacity can be attained.

This indicates that γ-BL has a very strong protective action for the anode or cathode under high temperature and high humidity.

However, γ-BL is generally inferior to PC in high-rate discharge characteristics. Therefore, the mixed system of PC and γ-BL gave the excellent result from their synergistic effect. Since DME is more excellent in high-rate discharge characteristics, of course the mixed system of PC, γ-BL and DME is best. LiBF$_4$ was used as solute in this case, but the effect was substantially the same when using LiClO$_4$, LiAlCl$_4$ LIPF$_6$ and LiAsF$_6$.

Also, it is possible to adopt an anode structure constituted by having a lithium-occlusive metal 3-1 and lithium 3-2 closely attached to each other as shown in FIG. 3(A) so that lithium is occluded into said metal in the electrochemical device. In this case, if one side of the metal 3-1 to which lithium is to be attached is roughened as by providing indentations as shown in FIG. 3(B), the adhesive strength between lithium 3-2 and metal 3-1 will be even more elevated.

Of course, other metals than the above said are usable if they can be alloyed with lithium.

INDUSTRIAL APPLICABILITY

As described above, in accordance with this invention, there is provided a rechargeable electrochemical device which is tolerant of overcharge and has a long charge/discharge service life and high reliability in long service use.

What is claimed is:
1. A rechargeable electrochemical device consisting of a positive electrode mainly composed of active car- bon; a negative electrode including lithium as an active material; and an electrolyte comprising an organic solvent containing γ-butyrolactone in which lithium salt is dissolved therein; wherein said negative electrode is compsed of a metal alloy which occludes lithium therein and a metal component other than lithium which is at least one element selected from the group consisting of Pb, Bi and Cd; and that the lithium content in the lithium alloy is selected such that said content, when converted into the electric capacity in the charged state, will become 10 to 20 times the electric capacity of the positive electrode capacity when the positive electrode was discharged until the single electrode potential vs. metallic lithium drops from 3.0 V to 2.0 V.

2. The recharageable electrochemical device according to claim 1, wherein the metal alloy has a current collector.

3. The rechargeable electrochemical device according to claim 1, wherein the metal alloy which occludes lithium therein has a roughened surface of convex-concave shape.

4. The rechargeable electrochemical device according to claim 1, wherein the organic solvent of the electrolyte contains at least propylene carbonate other than γ-butyrolactone.

5. The rechargeable electrochemical device according to claim 2, wherein the current collector is composed of material selected from the group consisting of Ni, Ti and stainless steel.

6. The rechargeable electrochemical device according to claim 1, wherein the metal compound other than lithium in the lithium alloy comprise Pb, Bi and Cd, and the composition thereof consisting of 3 to 30% by weight of Bi, 20 to 50% by weight of Cd and the remaining amount of Pb.

* * * * *